3,488,157
APPARATUS FOR MANUFACTURING, PURIFYING AND/OR DOPING MONO- OR POLYCRYSTALLINE SEMI-CONDUCTOR COMPOUNDS
Hans Koffer, Burghausen, Upper Bavaria, Germany, assignor to Wacker-Chemie G.m.b.H., Munich, Germany, a corporation of Germany
Filed June 28, 1965, Ser. No. 467,303
Claims priority, application Germany, July 3, 1964, W 37,104
Int. Cl. B01d 9/00; C01b 27/00; C01g 15/00
U.S. Cl. 23—273                              1 Claim

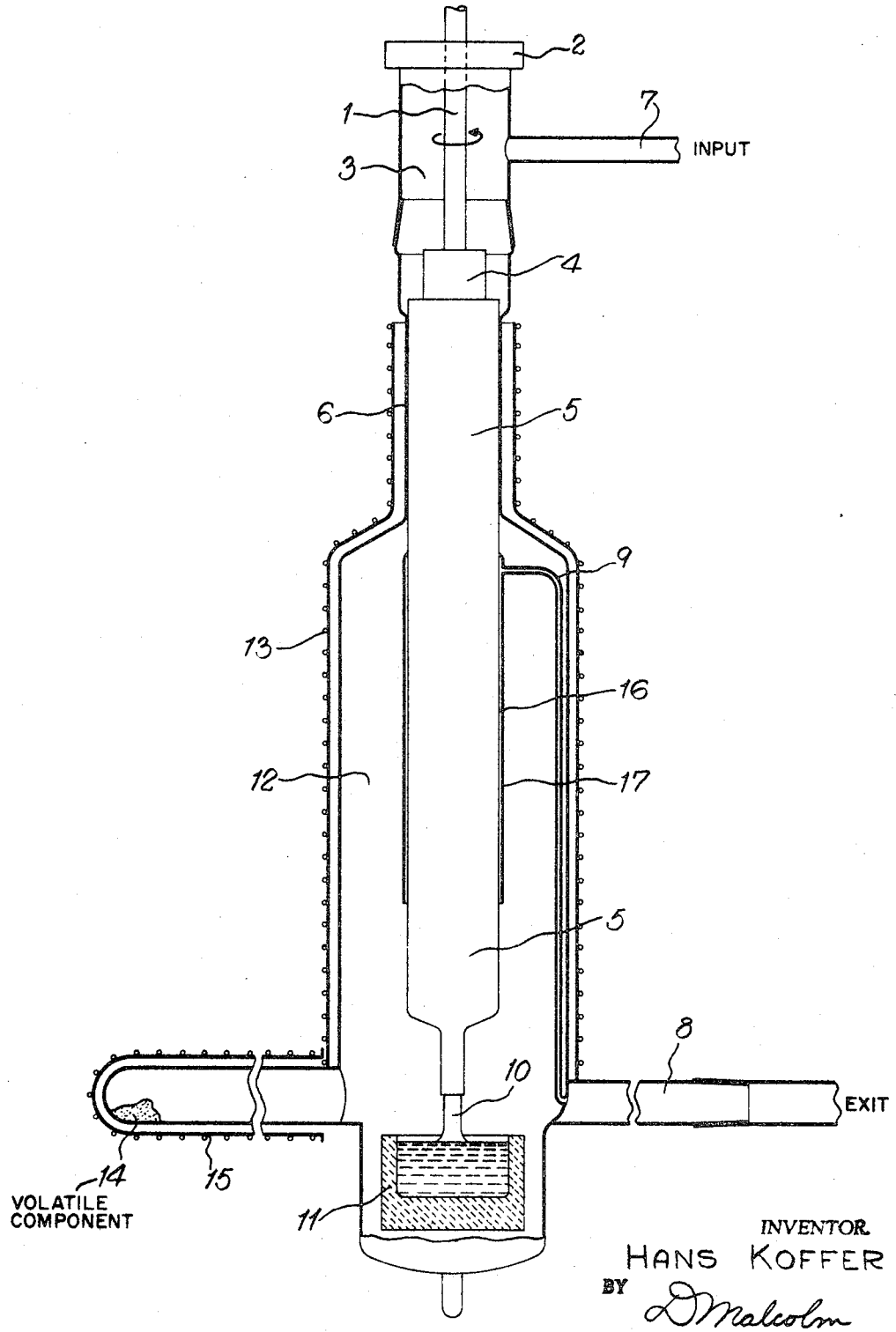

ABSTRACT OF THE DISCLOSURE

In the manufacture, purification and doping of mono- and polycrystalline semi-conductor compounds having one component which is readily volatile, a process and apparatus for drawing the crystal from a melt thereof in a reaction vessel which has openings for the inlet and outlet of gases, a rinsing gas being admitted to said vessel through said inlet opening at a pressure higher than the total pressure in the vessel, as gas being passed without appreciable loss of pressure through said vessel and about the compound being drawn from the melt, said gas being diffused outwardly through said outlet opening, and a body of said readily volatile component being heated and vaporized to maintain the partial pressure of said component in said vessel and compensate for losses of said component due to diffusion with said rinsing gas.

---

This invention relates to manufacturing, purifying and/or doping mono- or polycrystalline semi-conductor compounds, and it has for its object to provide a novel and improved process for this purpose.

Another object of the invention is to provide a simple and efficient process of the above type for manufacturing and treating decomposable semi-conductor compounds which have one readily volatile component and have presented special problems in the past.

Mono- and polycrystalline semi-conductor compounds having one component which is readily volatile are usually manufactured from the melt in an enclosed system. If crystals are obtained from the melt, e.g. by zone drawing or crucible drawing according to Czochralski, the growing crystal executes a turning movement relative to the melt, and a lifting movement may also be superimposed.

These processes are made difficult when manufacturing decomposable compound semi-conductors, e.g. gallium arsenide, because above the melt the vapor pressure of the more readily volatile component (arsenic in the case of gallium arsenide) must be maintained. In order to prevent its condensation, the entire space in which the readily volatile component is contained must be heated above the condensation temperature. This makes it difficult to transmit the rotating and lifting movement into the interior of the closed reaction vessel.

When working with a closed system it is known how to effect magnetically the movements of the seed which is contained in the closed apparatus.

Moreover it has been described previously how to use a liquid seal, where a quartz bell jas is moved in a molten metal.

According to another method, the movement is transferred into the interior of the vessel by a shaft made of chemically and thermally resistive material which should be sealed gas-tight if possible. However, it is not feasible to achieve absolute tightness with such a device which cannot be lubricated. During the crystal drawing a certain quantity of the vapor of the readily volatile component diffuses against an inert gas which is in the outer chamber, from inside outward, and condenses there. In order to prevent condensation occurring between the shaft and its guide, it must be kept at a temperature that is higher than the condensation temperature of the readily volatile component.

There is a danger in these processes of a possible explosion hazard in case of an excess pressure, or that the vapors of the readily volatile component may be pressed outward between the shaft and its guide, where they condense and cannot easily be removed. Moreover, the movable shaft can be blocked by condensing substances. This results in disturbances of the drawing process.

Another drawback is that doping by means of a doping gas cannot be carried out in a closed system.

I have now discovered a process for the manufacture, purification and/or doping of mono- and polycrystalline semi-conductor compounds, one component of which is readily volatile, where the crystal is allowed to grow from the melt, and which eliminates the above drawbacks. The process is characterized by the fact that I work in an open system having an aperture which is under the excess pressure of a rinsing gas, relative to the total pressure inside the reaction vessel, and the rinsing gas is conducted practically without loss of pressure through the interior of the reaction vessel or through parts thereof, then through a diffusion path and finally through an exit opening.

As rinsing gases there may be mentioned hydrogen, nitrogen, rare gases, doping gases or a mixture of these.

When the process is carried out, the interior of the reaction vessel is at least at the condensation temperature of the readily volatile component. Moreover, a lower pressure is always found there than at the input of the rinsing gas, even when inside the reaction vessel there is an increased pressure.

The opening which is under the overpressure of the rinsing gas, and therefore the rinsing gas flows through it, may be a narrow nozzle if no relative movement of melt and growing crystal is required (e.g. during boat-growing). In rotatory designs, as hereinafter described, the rinsing gas flows in through the leakage space between the shaft and its guide, which have a temperature higher than the condensation temperature. In both cases the exit through this opening due to diffusion of the vapor of the readily volatile component is completely suppressed by the gas that flows in. Likewise impossible is a condensation of substances between shaft and its guide, which could result in blockage. This guarantees an extremely even lifting movement which is also advantageous for the eventual manufacturing of so-called "webs."

The excess pressure at the input aperture is set according to the desired flow-through speed, and this speed can also be changed during the drawing process.

If the through-put gas is to have an influence on the melt, e.g. when doping by means of this gas or when removing an oxide film on the melt surface by means of hydrogen, then the gas is sent through the entire reaction chamber.

If such influence is not absolutely necessary, the process is preferably carried out in an apparatus where the inside of the reaction vessel is divided by a diffusion path into the actual reaction chamber and into a flowthrough path, where the gas flows only through the latter. However, here too, the melt can be influenced by the stream of gas, although to a lesser degree. The diffusion space here is a path where the length and the cross-section are attuned to each other and which on both ends is limited by gases of varying partial pressures. However, the total pressure on both ends of the diffusion path is practically equal. At any time only a small diffusion stream should flow through the diffusion path. It is the effect of the diffusion path that the gas flowing through, exits again even before it is completely mixed with the vapor of the readily volatile component. Thereby the loss of the readily volatile component can be greatly reduced.

The maintenance of the partial pressure of the readily volatile component and the compensation of the losses by rinsing and diffusion is generally achieved by a body which consists of the readily volatile component and which is kept at a corresponding high temperature.

Before the rinsing gas leaves the system, it streams through another diffusion path. The vapor of the readily volatile component which has been taken up is condensed out, after leaving the system, by cooling.

The invention is described in connection with the accompanying drawing which is a diagrammatic illustration of an apparatus embodying the invention in its application to the crucible drawing of gallium arsenide.

In the drawing, a metal shaft 1 is guided through a vacuum-tight simmering packing 2 into an unheated chamber 3. By a flexible coupling 4 a quartz rod 5 is fixed to the metal shaft 1, the rod being movable in (it makes a very close running fit with) the very tight-fitting sleeve 6. By means of the input tube 7, a pressure difference of 0.1 to 3 torr is maintained in the chamber 3 relative to the exit tube 8. This practically falls off entirely at the surface between the quartz rod 5 and the sleeve 6, and only to a small extent at the capillary tube 9. Depending on the quality of the ground surface, a flow speed of the rinsing gas between 0.002 and 0.02 l./h. corresponds to this over-pressure.

The seed 10 which can be lifted and lowered by rotation in any suitable manner, is fixed to the quartz rod 5. The crucible 11, which is heated in accordance with any suitable or usual method, contains the gallium arsenide melt. The interior of the reaction vessel 12 forms a unit with the sleeve 6 and is heated in a resistance oven 13, and there an arsenic partial pressure of, say, 760 torr is produced therein in the known manner by an arsenic body 14 by means of another resistance heater 15. That pressure, together with the partial pressure of the rinsing gas, forms the total pressure inside the reaction vessel 12 (for instance 800 torr) and is only slightly higher than the pressure of the rinsing gas at the exit 8. Since exit 8 is not heated, the arsenic partial pressure there is zero.

The outflow of arsenic from the apparatus is largely suppressed by the diffusion space 16 (practically an enlargement of the quartz sleeve 6 by, say, 0.005 mm.) between quartz rod 5 and cylindrical sleeve 17, and the capillary tube 9 (inside width 1 mm., length 200 mm.), which is practically a diffusion path, too. In these the arsenic vapor diffuses against the rinsing gas. At the same time the rinsing gas is flowing very slowly through the capillary tube 9 in the same direction as the diffusing arsenic.

The invention claimed is:

1. Apparatus for manufacturing, purifying and doping mono- and polycrystalline semi-conductor compounds having one component which is readily volatile, comprising a vessel having an upper chamber containing an inlet opening for the admission of a rinsing gas under pressure and a lower reaction chamber having an outlet opening for the discharge of gases, a crucible in said reaction chamber adapted to contain a melt of said semi-conductor compound, a rotatable and vertically movable rod extending through said upper and lower chambers and having means for drawing semi-conductor compound from said melt, said rod acting in a tight-fitting bearing between said upper and lower chambers permitting rinsing gas under pressure to pass from said upper chamber into said lower chamber, means for vaporizing a body of said readily volatile component in said lower chamber, a sleeve in said lower chamber surrounding said rod with sufficient clearance space for the diffusion of gases upwardly between said sleeve and said rod, and a capillary tube connecting said outlet opening with the upper portion of said clearance space between said sleeve and said rod to conduct gases to said outlet opening.

References Cited

UNITED STATES PATENTS

| 2,892,739 | 6/1959 | Rusler | 23—301 |
| 3,260,573 | 7/1966 | Ziegler | 23—301 |
| 2,962,363 | 11/1960 | Martin | 23—301 |
| 3,036,888 | 5/1962 | Lowe | 23—273 |
| 3,154,384 | 10/1964 | Jones | 23—273 |
| 3,338,761 | 8/1967 | Cheney | 23—273 |

OTHER REFERENCES

Zone Melting by Pfann, 1958, John Wiley & Sons, pp. 158, 159.

Preparation of Single Crystals by Lawson, 1958, London Butterworths Scientific Publication, pp. 18, 19.

NORMAN YUDKOFF, Primary Examiner

U.S. Cl. X.R.

23—301